(12) United States Patent
Mudalige et al.

(10) Patent No.: US 9,165,470 B2
(45) Date of Patent: Oct. 20, 2015

(54) AUTONOMOUS CONVOYING TECHNIQUE FOR VEHICLES

(75) Inventors: Upali Priyantha Mudalige, Oakland Township, MI (US); Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 300 days.

(21) Appl. No.: 13/189,846

(22) Filed: Jul. 25, 2011

(65) Prior Publication Data

US 2013/0030606 A1 Jan. 31, 2013

(51) Int. Cl.
G05D 1/02 (2006.01)
G08G 1/00 (2006.01)
B60W 50/00 (2006.01)

(52) U.S. Cl.
CPC ............... G08G 1/22 (2013.01); G05D 1/0293 (2013.01); *B60W 2050/008* (2013.01); *B60W 2550/402* (2013.01); *G05D 1/0278* (2013.01)

(58) Field of Classification Search
CPC ... G08G 1/122; G05D 1/0293; G05D 1/0278; B60W 2550/402; B60W 2050/008
USPC .................... 701/300–312, 2, 23–25
See application file for complete search history.

(56) References Cited

U.S. PATENT DOCUMENTS

| | | | |
|---|---|---|---|
| 5,572,449 A | 11/1996 | Tang et al. | |
| 6,720,920 B2 | 4/2004 | Breed et al. | |
| 7,831,345 B2 | 11/2010 | Heino et al. | |
| 2007/0043502 A1* | 2/2007 | Mudalige et al. | 701/207 |
| 2007/0043506 A1* | 2/2007 | Mudalige et al. | 701/301 |
| 2008/0091340 A1* | 4/2008 | Milstein et al. | 701/201 |

FOREIGN PATENT DOCUMENTS

DE 102010013647 A1 2/2011

OTHER PUBLICATIONS

Steven E. Schladover, et al., Automatic Vehicle Control Developments in the PATH Program, IEEE Transactions on Vehicular Technology, vol. 40, No. 1, Feb. 199, pp. 114-130.
Pravin Varaiya, Smart Cars on Smart Roads: Problems of Control, IEEE Transactions on Automatic Control, vol. 38, No. 2, Feb. 1993, pp. 195-207.

* cited by examiner

*Primary Examiner* — Redhwan K Mawari
*Assistant Examiner* — Rodney P King

(57) ABSTRACT

A method of autonomously convoying vehicles traveling along a route with a leader vehicle being in communication with at least one follower vehicle. The at least one follower vehicle receives a communication relating to a target offset position and route data. Tracking data is generated and derived from on-board sensing devices of the at least one follower vehicle that includes a traveled path of the leader vehicle sensed by the at least one follower vehicle. The route data is compared to the tracking data for identifying accuracy between the route data relative to the tracking data. An adjusted target offset position and a set of trajectory points that provides a trajectory path of travel from a current position of the at least one follower vehicle to the adjusted target offset position are determined based on the accuracy between the route data and the tracking data.

19 Claims, 3 Drawing Sheets

AUTONOMOUS CONVOYING TECHNIQUE FOR VEHICLES

BACKGROUND OF INVENTION

An embodiment relates generally to vehicle-to-vehicle communications.

Autonomous vehicle platoons, also known as convoys, utilize a common route planning among vehicles in the convoy for maintaining a formation among the vehicles of the convoy. The convoy consists of a leader vehicle and trailer vehicles wherein the trailer vehicles receive a guidance signal from the vehicle ahead of it for maintaining a path of travel. Such systems may utilize a sensing system to maintain a safe distance with the vehicle ahead. Each member vehicle of the convoy knows the route and destination in advance, and the location along the route at any given point in time. Such systems require a shared drivable route, such as a maplet with way points, speed, and other driver vehicle target tracking using a combination of sensors.

The drawbacks of prior art approaches are that the routes need to be known in advance. Prior art systems have relied on external positioning systems such as magnetic strips and GPS, and may also experience computational latencies caused by scene construction, simultaneous localization, and real time object detection and classification.

SUMMARY OF INVENTION

An advantage of an embodiment is for enabling safe vehicle convoys for connected vehicles utilizing vehicle-to-vehicle communications. The leader vehicle can be under autonomous or manual control whereas the follower vehicles are autonomously controlled. Wireless vehicle-to-vehicle data is combined with on-board sensor data in a technique that is based on real-time GPS and sensor errors to derive accurate and safe target tracking analysis of locations for the follower vehicles.

An embodiment contemplates a method of autonomously convoying vehicles traveling along a route with a leader vehicle being in communication with at least one follower vehicle. The at least one follower vehicle receiving a communication relating to a target offset position and route data. The target offset position identifying a target position relative to the leader vehicle, and the route data including a path history and predicted path of the leader vehicle. The route data further including a global position and a GPS solution of the leader vehicle. Tracking data derived from on-board sensing devices of the at least one follower vehicle is generated. The tracking data includes a traveled path of the leader vehicle sensed by the at least one follower vehicle. The route data and the tracking data are compared for identifying accuracy between the route data relative to the tracking data. An adjusted target offset position and a set of trajectory points are determined that provides a trajectory path of travel from a current position of the at least one follower vehicle to the adjusted target offset position based on the accuracy between the route data and the tracking data. The at least one follower vehicle generates control signals for autonomously transitioning the at least one follower vehicle along the set of trajectory points to the adjusted target offset position.

DETAILED DESCRIPTION

Figure 1:
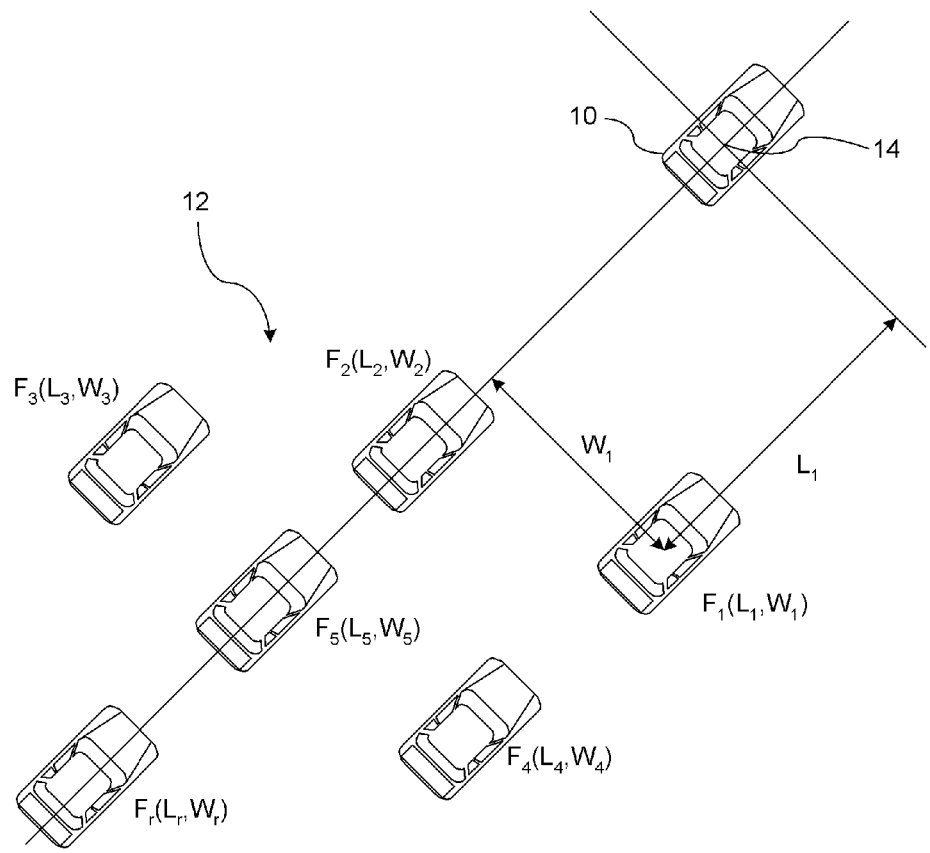
FIG. 1 is a block diagram of an inter-vehicle communication system.

There is shown in FIG. 1 a leader vehicle 10 in communication with a plurality of follower vehicles 12 that form a convoy. The leader vehicle 10 is predetermined and may be autonomously or manually controlled. The follower vehicles 12 autonomously attempt to follow the driven route of the leader vehicle 10. It should be understood that the leader vehicle 10 does not necessarily have to be in the front of the convoy. Rather, the leader vehicle 10 may be in the front of the convoy, in the middle of the convoy, or at the end of the convoy.

The leader vehicle 10 and the follower vehicles 12 utilize vehicle-to-vehicle (V2V) messaging for communicating data between the vehicles. The leader vehicle 10 and the respective follower vehicles 12 periodically broadcast wireless messages to one another over a respective inter-vehicle communication network, such as, but not limited to, a dedicated short range communication protocol (DSRC) as known in the art.

Vehicle-to-vehicle (V2V) wireless messages communicated between the vehicles may be transmitted as a standard periodic beacon message and may include data regarding environmental awareness conditions relating to its vehicle position, travel path history, predicted path, GPS quality, and other vehicle kinematics/dynamic parameters. The leader vehicle 10 will also transmit position offsets relative to its path history or predicted path. The position offsets identify a latitude and longitude positioning relative to the leader vehicle 12 that identifies the desired target positions for the follower vehicles 12 in the convoy. The target offset position may be determined by back-propagating along a path of travel.

The latitude and longitude offset positioning is based on a coordinate system relative to the leader vehicle 10 which is generally represented as 14. The leader vehicle 10 represents the origin of the coordinate system 14. The offset may be represented by a length and width ($L_r$, $W_r$) relative to the origin. The symbol $L_r$ represents a longitudinal distance from the origin of the vehicle and the symbol $W_r$ represents a lateral distance from the origin of the vehicle. It should be understood that the longitudinal axis is always perpendicular to a front/rear of the vehicle and the lateral axis is always perpendicular to the sides of the vehicle. The leader vehicle 10 will identify each follower vehicle in the convoy by an identifier, for example ($F_r$). As a result, an target offset position for a first follower vehicle in the convoy is identified by $F_1$ ($L_1$, $W_1$). An target offset position for a second follower vehicle is identified by $F_2$ ($L_2$, $W_2$). The remaining vehicles will be identified by their respective identifier and target offset position $F_n$ ($L_n$, $W_n$). In the event the leader of a convoy ceases to exist or fails to communicate regularly within a timeout period (e.g., 2 seconds) to its follower vehicles, a respective follower vehicle will assume a safe longitudinal offset distance ($L_{safe}$) from the vehicle ahead, based on its speed and GPS accuracy. GPS accuracy is the average 2-D longitudinal and lateral position uncertainty in meters, estimated by the GPS receiver unit of the follower vehicle.

The road, however, is often curved and the vehicle heading of the leader vehicle 10 at any given point may not necessarily be a same vehicle heading as the follower vehicles 12. As a result, a desired target position dictated by the leader vehicle 10 may not necessarily be a true position of where the follower vehicles 12 should be located since the leader vehicle is basing the axes of the coordinate system 14 on its current vehicle heading. For example, if a respective follower vehicle is provided a target position from the leader vehicle of (30,3), this would indicate that the target offset position of the follower vehicle be at a position of 30 meters rearward and 3 meters to one side. This would be easily identified in the coordinate system 14 if both vehicles were traveling in a same heading (e.g., due north) thereby utilizing a same longitudinal and lateral axis, but if the leader vehicle 10 were traveling, for example, due north, and a respective follower vehicle were traveling, for example, northeast, there would be a disconnect between the target offset position based on their heading. Therefore, the respective follower vehicle must track the leader vehicle 10 in order to determine the target offset position with respect to the traveled route when the leader vehicle 10 was 30 meters rearward along its traveled path, particularly when the traveled route is non-linear.

The respective follower vehicle must also determine if there are any inaccuracies between the tracked path generated by its own on-board sensors and the route data (e.g., path history etc.) supplied in the V2V communications by the leader vehicle. To do so, the at least one follower vehicle must fuse the tracking data with the route data. The respective follower vehicle must also assess and compensate for any sensor errors and biases in the data. Based on the inaccuracies in both sets of data, weighting factors may be applied to sensor data, bias data, and GPS data. The weighting factor provides a degree as to how much the respective parameter should be relied upon in adjusting the target offset position.

Based on the resulting adjusted target offset position, the follower vehicles 12 generate smooth control signals to the powertrain system and/or steering system for maintaining the desired target position.

Figure 2:
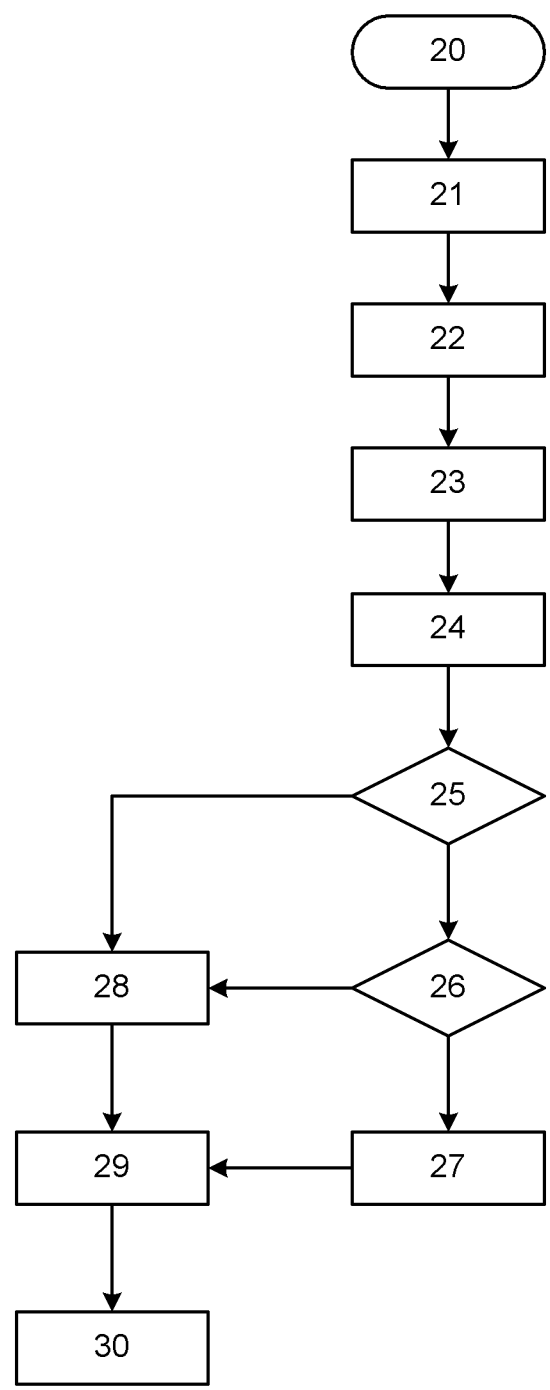
FIG. 2 is a flowchart of a method for autonomously controlling follower vehicles in a convoy.

FIG. 2 illustrates a flow diagram for determining the target offset position for the follower vehicles.

In block 20, the routine is initiated and communications are enabled between the leader vehicle and the follower vehicles. In block 21, the leader vehicle calculates path history and a predicted path based on the leaders GPS positions, road curvature, speed, and longitudinal and latitude acceleration (hereinafter referred to as route data).

In block 22, the leader vehicle broadcasts V2V messages that include the route data to the follower vehicles. The route data includes the path history traveled, the predicted path of travel, GPS position, GPS quality/solution, and other vehicle kinematic and dynamic data.

In block 23, the follower vehicles receive the data received from the leader vehicle.

In block 24, the follower vehicle continuously tracks the leader vehicle's traveled path and vehicle position (hereinafter referred to as tracking data) using on-board sensors. The on-board sensors may include, but are not limited to, range/radar sensors, vision sensors, and lidar sensors.

In block 25, a determination is made as to whether a position of the leader vehicle determined by both the tracking data and the route data reported in the V2V message is substantially a same location. If the determination is made that the position location as determined by follower vehicles and the leader vehicle is substantially the same, the routine proceeds to block 26, otherwise the routine proceeds to block 28.

In block 26, a determination is made as to whether the leader vehicle and the at least one follower GPS solutions are within a GPS error threshold. The GPS solution provides a type of accuracy correction technique applied to GPS reporting. The GPS solution type also indicates the level of GPS accuracy. Examples of GPS solutions include, but are not limited to, Real Time Kinematics (RTK), Wide Area Augmentation System (WAAS), and uncorrected GPS. Based on the solution used by the leader vehicle and at least one follower, an assessment may be made as to the GPS solution accuracy. If the determination is made that the GPS solution is within a GPS horizontal error threshold, then the routine proceeds to block 27, otherwise the routine proceeds to step 28. GPS horizontal error is predicted by the GPS receiver. GPS horizontal error includes longitude and latitude error components expressed in centimeters. For example, a 100 cm longitude error and 50 cm latitude error components can be used as GPS horizontal error thresholds to make such determinations.

In block 27, weighting is applied to sensor parameters, bias parameters, and GPS parameters. The weighting factors applied to each of the three parameters adds up to "1". Therefore, proportionate weighting as well as disproportionate weighting can be applied to each of the three parameters. Given the determination in blocks 26 and 27 that the tracked data and the route data are within a predetermined tracking error threshold, typically in the range of 0.25-1.0 meters, depending on the speed of the convoy, relative position of the follower within the convoy, vehicle type etc., and that the leader vehicle's GPS solution is within the GPS error threshold, then full weight is applied to the GPS parameters. Therefore, a weighting factor of "0" is applied to the sensor data; a weighting factor of "0" is applied to the bias factor, and a weighting factor of "1" is applied to the GPS data. As a result, the GPS data is fully relied on for assessing the target offset position. The routine proceeds to step 29. These weighting factors are function of the signal noise ratio of the GPS and sensor measurements. For example, the weighting factor "1" is applied to the GPS data if the number of visible satellites is larger than 4, dilution of precision (DOP) is less than a threshold (typical less than 2 meters), and pseudo-range (code range) measurement signal noise ratio (larger than 24 dB). The weighting factor can be set to "1" if a covariance matrix of sensor measurement of the leading vehicle is less than a threshold (e.g., 0.25-1.0 meter).

Figure 3:
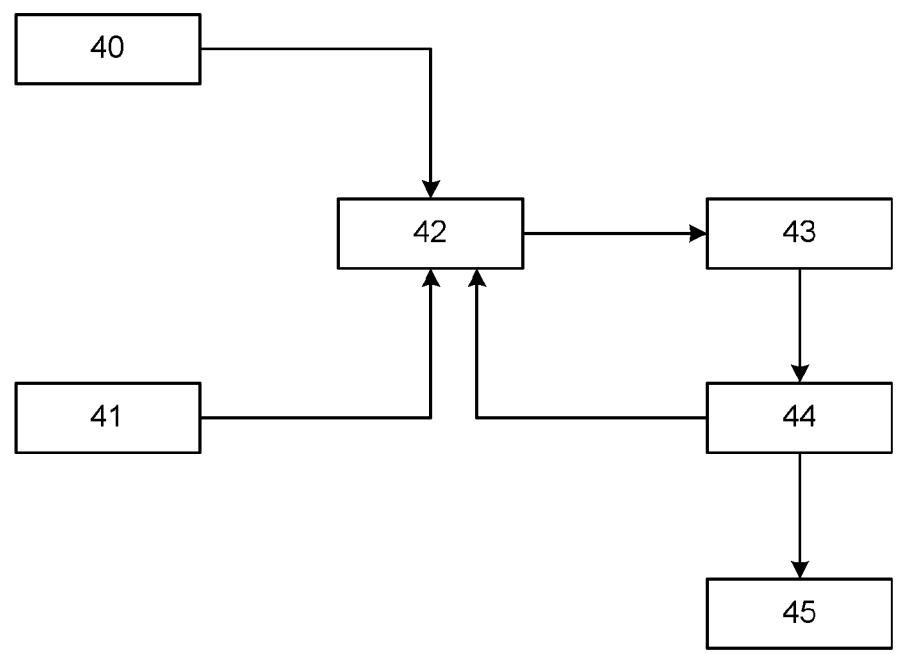
FIG. 3 is a flowchart of a method for data fusion for determining weighting factors for parameter data.

In block 28, a fusion technique is applied using route data and the tracking data for cooperatively determining a position and travel path history of the leader vehicle using weighting factors (which is the function of noise covariance matrices from GPS positioning and sensor measurement, basically the larger of the trace of the covariance matrix, the smaller the weighting factors) that are applied to three parameters (i.e., sensor parameters, bias parameters, and GPS parameters) when the tracking data and the route data are not substantially the same. FIG. 3 illustrates a flow diagram for determining the weights to be applied to each of the three parameters when the tracking data and route data are not within the predetermined tracking error threshold or when the leader vehicle's or own vehicle's GPS solution is outside of the GPS error threshold.

In block 29, the weighted parameters are used to calculate the best fit traveled path. That is, desired points are identified based on the fused data so that the follower vehicles are provided a trajectory path having a plurality of intermediate goal points identified between the follower current position and the target offset position that will guide the follower vehicle to the target offset position. As described earlier, the road is typically a linear and non-linear course of travel. If only a target offset position were provided, a vehicle would travel a straight line to the target offset position, which would function appropriately if the vehicles were traveling along a linear path. However, since the road includes non-linear segments, a straight line course of travel is not always present and could result in a vehicle not maintaining its lane of travel. As a result, the desired points are identified between the vehicle's position and the target offset position for transitioning the vehicle from its current location to the target offset position.

In block 30, control signals are generated for maintaining a desired path of travel to the target offset position.

FIG. 3 illustrates a flowchart for determining the weighted parameters. In block 40, the follower vehicles obtain the vehicle-to-vehicle data which includes the path history of the leader vehicle and the desired offsets as determined by the leader vehicle.

In block 41, the follower vehicle obtains range sensor information which includes the tracked path of the leader vehicle using the on-board sensors of the follower vehicles.

In block 42, sensor registration is performed. Sensor registration is a process of removing or accounting for non-random errors or biases in the sensor data. Without properly compensating for such errors, the composition of the entire network of sensors may be less precise than an individual sensor and the will degrade the tracking of the leader vehicle over time. Therefore, it is imperative that the error and biases be accounted for and removed. Sensor registration further involves the transformation of the vehicle-to-vehicle data from the leader vehicle to the same local vehicle coordinate frame of the sensor data. The sensor data is subtracted by a bias distance estimated from a previous set of data. Such previous set of data may include, but is not limited to, fixed data offsets caused by sensor alignment and vehicle orientation.

In block 43, data association is performed. In data association, route data from the leader vehicle is mapped onto a same coordinate system as the tracking data captured by the follower vehicle. The closest trajectories are determined between the route data and tracking data relating the leader vehicle's trajectory. The data that has a most current time stamp is provided with a larger weight.

In block 44, fixed-lag smoother is applied to the output data from the data association function. Various techniques can be used for applying fixed lag smoothing such as, but not limited to, a Kalman filter. Fixed-lag smoothing is used to observe measurements over time that contain noise and other inaccuracies and generate results that have a tendency to be closer to the true values of the measurements and their associated calculated values. An estimated bias in the form of a feedback is provided back to block 42.

In block 45, the route data and tracking data of the leader's trajectory points are merged and the weighting factors for the sensor parameter, bias parameter, and GPS parameter are provided so as to re-adjust the target offset position, by compensating for errors in the sensor or GPS data.

While certain embodiments of the present invention have been described in detail, those familiar with the art to which this invention relates will recognize various alternative designs and embodiments for practicing the invention as defined by the following claims.

What is claimed is:

1. A method for autonomously convoying vehicles traveling along a route with a leader vehicle being in communication with at least one follower vehicle, the method comprising the steps of:
    the at least one follower vehicle receiving a communication from the leader vehicle relating to a target offset position and route data, the target offset position dictated by the leader vehicle establishing a dictated convoy formation between the leader vehicle and the at least one follower vehicle by identifying a target position of the at least one follower vehicle relative to the leader vehicle, and the route data including a path history and predicted path of the leader vehicle, the route data further including a global position and a GPS solution of the leader vehicle;
    generating tracking data derived from on-board sensing devices of the at least one follower vehicle, wherein the tracking data includes a traveled path of the leader vehicle sensed by the at least one follower vehicle;
    identifying whether a position of the leader vehicle as determined by both the route data and the tracking data is substantially at a same location by determining an accuracy between the route data relative to the tracking data;
    determining an adjusted target offset position and a set of trajectory points that provides a trajectory path of travel from a current position of the at least one follower vehicle to the adjusted target offset position based on the accuracy between the route data and the tracking data; and
    the at least one follower vehicle generating control signals for autonomously transitioning the at least one follower vehicle along the set of trajectory points to the adjusted target offset position to maintain the dictated convoy formation between the leader vehicle and the at least one follower vehicle.

2. The method of claim 1 wherein comparing the accuracy of the route data relative to the tracking data comprises the following steps:
    determining whether the route data and the tracking data are within a predetermined tracking error threshold; and
    if the route data and tracking data are within a predetermined tracking error threshold, then determining whether a GPS solution of the leader vehicle and the at least one follower vehicle are within a GPS error threshold.

3. The method of claim 2 further comprising the step of:
    in response to determining that the GPS solution is within a GPS error threshold, setting the target offset position as transmitted by the leader vehicle as the adjusted target offset position for the at least one follower vehicle.

4. The method of claim 2 wherein if either the route data or the tracking data are not within a predetermined tracking error threshold or the GPS solution of the leader vehicle or the at least one follower vehicle is outside of the GPS error threshold, then the at least one follower vehicle adjusts the target offset position by weighting parameter data, wherein the parameter data includes sensor data, sensor bias data, and global positioning system data.

5. The method of claim 4 wherein weighting the parameter data includes applying respective weighting factors to each of the parameter data, wherein each of the weighting factors adds up to 1.

6. The method of claim 5 wherein the weighting factors are determined by a data fusion procedure that includes a sensor registration technique, a data association technique, and a fixed-lag smoother technique.

7. The method of claim 6 wherein a bias of each sensor is estimated, wherein the estimated bias is provided as feedback for sensor registration.

8. The method of claim 7 wherein the bias of each sensor is estimated simultaneously.

9. The method of claim 1 wherein the target offset position is determined by back-propagating along a path of travel.

10. The method of claim 1 wherein communications between the leader vehicle and the at least one follower vehicle utilizes a vehicle-to-vehicle communications network.

11. The method of claim 10 wherein a dedicated short range communication protocol is used to broadcast messages within the vehicle-to-vehicle communication network.

12. The method of claim 1 wherein the target offset position is determined by the leader vehicle.

13. The method of claim 12 wherein the target offset position received by the at least one follower vehicle is communicated from the leader vehicle.

14. The method of claim 12 wherein the route data further includes GPS accuracy of the leader vehicle.

15. The method of claim 12 wherein the route data further includes GPS accuracy of the at least one follower vehicle.

16. The method of claim 12 wherein if a leader is not identified within a predetermined period of time, the following vehicle will maintain a longitudinal offset distance from a vehicle forward of the following vehicle that is a function of a speed and the GPS accuracy of the at least one follower vehicle.

17. The method of claim 1 wherein the leader vehicle broadcasts target offset positions and the route data to the at least one follower vehicle.

18. The method of claim 1 wherein the leader vehicle is controlled autonomously.

19. The method of claim 1 wherein the leader vehicle is controlled manually.

* * * * *